US008495258B2

(12) United States Patent
Bakke et al.

(10) Patent No.: US 8,495,258 B2
(45) Date of Patent: *Jul. 23, 2013

(54) IMPLEMENTING STORAGE ADAPTER PERFORMANCE OPTIMIZATION WITH HARDWARE ACCELERATORS OFFLOADING FIRMWARE FOR BUFFER ALLOCATION AND AUTOMATICALLY DMA

(75) Inventors: Brian E. Bakke, Rochester, MN (US); Brian L. Bowles, Rochester, MN (US); Michael J. Carnevale, Rochester, MN (US); Robert E. Galbraith, II, Rochester, MN (US); Adrian C. Gerhard, Rochester, MN (US); Murali N. Iyer, Rochester, MN (US); Daniel F. Moertl, Rochester, MN (US); Mark J. Moran, Minneapolis, MN (US); Gowrisankar Radhakrishnan, Rochester, MN (US); Rick A. Weckwerth, Oronoco, MN (US); Donald J. Ziebarth, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 72 days.

This patent is subject to a terminal disclaimer.

(21) Appl. No.: 13/114,124

(22) Filed: May 24, 2011

(65) Prior Publication Data
US 2012/0303855 A1  Nov. 29, 2012

(51) Int. Cl.
*G06F 13/28* (2006.01)
(52) U.S. Cl.
USPC .............................. 710/22; 710/24
(58) Field of Classification Search
USPC ........................................................ 710/24
See application file for complete search history.

(56) References Cited

U.S. PATENT DOCUMENTS

| 6,324,599 | B1 * | 11/2001 | Zhou et al. ...................... 710/26 |
| 6,684,270 | B1 | 1/2004 | Chmara et al. |
| 7,680,968 | B2 * | 3/2010 | Burton ............................ 710/62 |
| 2004/0162926 | A1 | 8/2004 | Levy |
| 2005/0114561 | A1 * | 5/2005 | Lu et al. ......................... 710/24 |
| 2007/0162637 | A1 | 7/2007 | Mirabeau et al. |
| 2008/0059699 | A1 | 3/2008 | Kubo et al. |

(Continued)

OTHER PUBLICATIONS

IBM; "ServeRAID B5015 SSD Controller is an Enterprise-grade RAID adapter offering the highest performance and data protection optimized for next generation SSDs"; IBM Hardware announcement 110-113; May 18, 2010.

(Continued)

*Primary Examiner* — Ernest Unelus
(74) *Attorney, Agent, or Firm* — Joan Pennington

(57) ABSTRACT

A method and controller for implementing storage adapter performance optimization with automatic chained hardware operations eliminating firmware operations, and a design structure on which the subject controller circuit resides are provided. The controller includes a plurality of hardware engines and a control store configured to store a plurality of control blocks. Each control block is designed to control a hardware operation in one of the plurality of hardware engines. A plurality of the control blocks is selectively arranged in a respective predefined chain to define sequences of hardware operations. An automatic hardware structure is configured to build the respective predefined chain controlling the hardware operations for a predefined hardware function. The predefined hardware function includes buffer allocation and automatic DMA data from a host system to the controller for write operations, eliminating firmware operations.

22 Claims, 12 Drawing Sheets

U.S. PATENT DOCUMENTS

| | | | |
|---|---|---|---|
| 2008/0244227 | A1 | 10/2008 | Gee et al. |
| 2008/0263307 | A1* | 10/2008 | Adachi .................. 711/171 |
| 2009/0138627 | A1* | 5/2009 | Shah et al. .................. 710/24 |
| 2009/0228660 | A1 | 9/2009 | Edwards et al. |
| 2010/0199039 | A1 | 8/2010 | Bauman et al. |
| 2011/0314186 | A1 | 12/2011 | Go et al. |

OTHER PUBLICATIONS

Laing, C.-et al.; "DS8000 Performance Monitoring and Tuning"; IBM.com/Redbooks; IBM Corporation; Chapters 4-5; pp. 80-85; Mar. 2009.

"Implementing Storage Adapter Performance Optimization With Chained Hardware Operations Minimizing Hardware/Firmware Interactions" by Brian E. Bakke et al., U.S. Appl. No. 13/114,107, filed herewith.

"Implementing Storage Adapter Performance Optimization With Cache Data/Directory Mirroring" by Brian E. Bakke et al., U.S. Appl. No. 13/114,185, filed herewith.

"Implementing Storage Adapter Performance Optimization With Parity Update Footprint Mirroring" by Brian E. Bakke et al., U.S. Appl. No. 13/114,268, filed herewith.

"Implementing Storage Adapter Performance Optimization With Hardware Chains to Select Performance Path" by Brian E. Bakke et al., U.S. Appl. No. 13/114,291, filed herewith.

"Implementing Storage Adapter Performance Optimization With Chained Hardware Operations and Error Recovery Firmware Path" by Brian E. Bakke et al., U.S. Appl. No. 13/114,354, filed herewith.

"Implementing Storage Adapter Performance Optimization With Enhanced Hardware and Software Interface" by Brian E. Bakke et al., U.S. Appl. No. 13/114,390, filed herewith.

"Implementing Storage Adapter Performance Optimization With Enhanced Resource Pool Allocation" by Brian E. Bakke et al., U.S. Appl. No. 13/114,427, filed herewith.

* cited by examiner

300

| OFFSET 302 | SIZE 304 | | DEFINITION 306 |
|---|---|---|---|
| 000:03F | 256 B | 64B | RESERVED FOR FIRMWARE |
| 040:07F | | 64B | RESERVED |
| 080:0BF | | 64B | HW CB #1  308 |
| 0C0:0FF | | 64B | HW CB #2  308 |
| 100:13F | 256 B | 64B | HW CB #3  308 |
| 140:17F | | 64B | HW CB #4  308 |
| 180:1BF | | 64B | HW CB #5  308 |
| 1C0:1FF | | 64B | HW CB #6  308 |
| 200:23F | 256 B | 64B | HW CB #7  308 |
| 240:27F | | 64B | HW CB #8  308 |
| 280:2BF | | 64B | HW CB #9  308 |
| 2C0:2FF | | 64B | HW CB #10  308 |
| 300:33F | 256 B | 64B | HW CB #11  308 |
| 340:37F | | 64B | HW CB #12  308 |
| 380:3BF | | 64B | HW CB #13  308 |
| 3C0:3FF | | 64B | HW CB #14  308 |
| 400:43F | 256 B | 64B | HW CB #15  308 |
| 440:47F | | 64B | HW CB #16  308 |
| 480:4BF | | 64B | HW CB #17  308 |
| 4C0:4FF | | 64B | THE FIRST 260-BYTES IS USED AS LIST SPACE FOR 65 INDICES ENOUGH TO COVER A 256K DMA THAT IS NOT ALIGNED. IF LIST SPACE IS ELSEWHERE THEN COULD BE USED FOR HW CB. FW WILL USE THE LAST 60-BYTES OF THIS. |
| 500:5FF | 256 B | | |
| 600:7FF | 512B | | RESERVED. COULD BE LIST SPACE OR HW CB. |

FIG. 3A

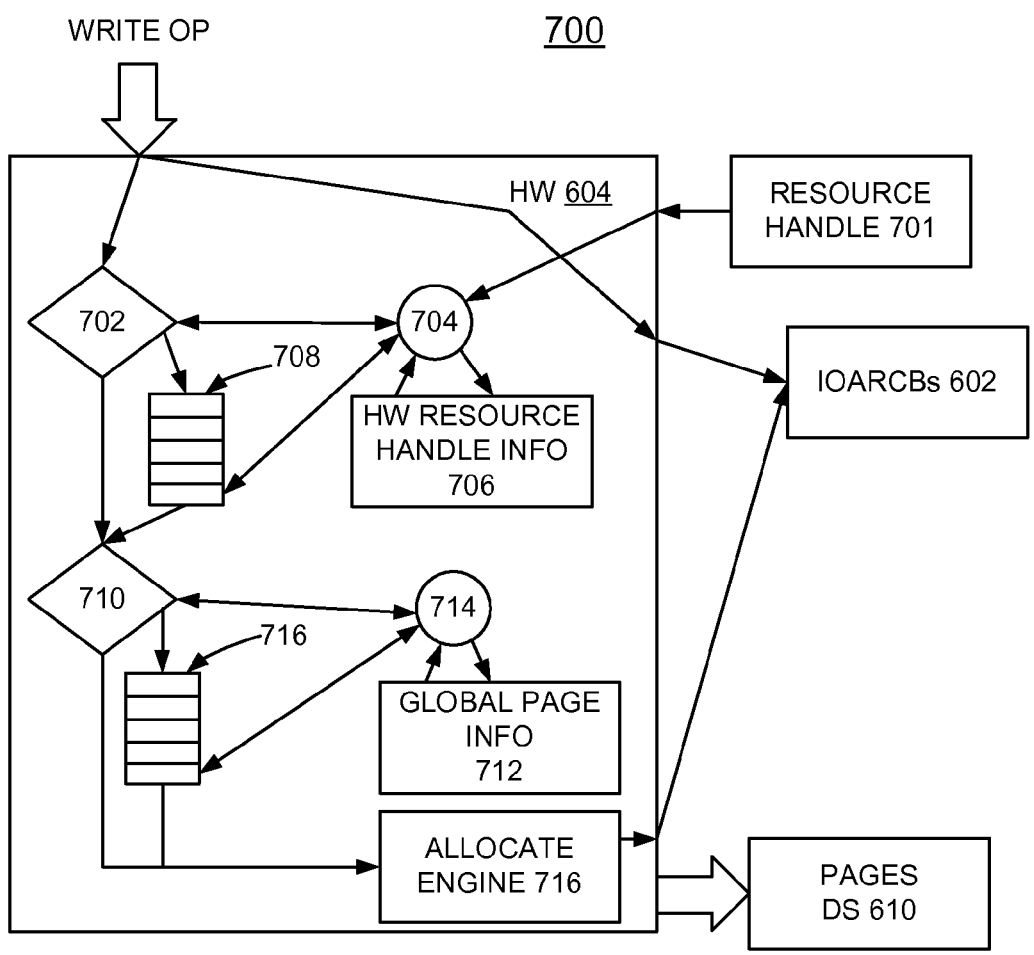

IMPLEMENTING STORAGE ADAPTER PERFORMANCE OPTIMIZATION WITH HARDWARE ACCELERATORS OFFLOADING FIRMWARE FOR BUFFER ALLOCATION AND AUTOMATICALLY DMA

FIELD OF THE INVENTION

The present invention relates generally to the data processing field, and more particularly, relates to a method and controller for implementing storage adapter performance optimization with automatic chained hardware operations eliminating firmware operations, and a design structure on which the subject controller circuit resides.

DESCRIPTION OF THE RELATED ART

Storage adapters are used to connect a host computer system to peripheral storage I/O devices such as hard disk drives, solid state drives, tape drives, compact disk drives, and the like. Currently various high speed system interconnects are to connect the host computer system to the storage adapter and to connect the storage adapter to the storage I/O devices, such as, Peripheral Component Interconnect Express (PCIe), Serial Attach SCSI (SAS), Fibre Channel, and InfiniBand.

For many years now, hard disk drives (HDDs) or spinning drives have been the dominant storage I/O device used for the persistent storage of computer data which requires online access. Recently, solid state drives (SSDs) have become more popular due to their superior performance. Specifically, SSDs are typically capable of performing more I/Os per seconds (IOPS) than HDDs, even if their maximum data rates are not always higher than HDDs.

From a performance point of view, an ideal storage adapter would never be a performance bottleneck to the system. However, in reality storage adapters are often a performance bottleneck to the computer system. One effect of the increasing popularity of SSDs is that the storage adapter is more often the performance bottleneck in the computer system.

A need exists for an effective method and controller for implementing storage adapter performance optimization. A need exists for such method and controller for use with either HDDs or SSDs and that significantly reduces the time required for an I/O operation, while efficiently and effectively maintaining needed functions of the storage adapter for various arrangements of the storage adapter and the storage I/O devices, such as utilizing Write Caching, and Dual Controllers configurations, and redundant array of inexpensive drives (RAID) read and write operations.

As used in the following description and claims, the terms controller and controller circuit should be broadly understood to include an input/output (IO) adapter (IOA) and includes an IO RAID adapter connecting various arrangements of a host computer system and peripheral storage I/O devices including hard disk drives, solid state drives, tape drives, compact disk drives, and the like.

SUMMARY OF THE INVENTION

Principal aspects of the present invention are to provide a method and a controller for implementing storage adapter performance optimization with automatic chained hardware operations eliminating firmware operations, and a design structure on which the subject controller circuit resides. Other important aspects of the present invention are to provide such method, controller, and design structure substantially without negative effects and that overcome many of the disadvantages of prior art arrangements.

In brief, a method and controller for implementing storage adapter performance optimization with automatic chained hardware operations eliminating firmware operations, and a design structure on which the subject controller circuit resides are provided. The controller includes a plurality of hardware engines and a control store configured to store a plurality of control blocks. Each control block is designed to control a hardware operation in one of the plurality of hardware engines. A plurality of the control blocks is selectively arranged in a respective predefined chain to define sequences of hardware operations. An automatic hardware structure is configured to build the respective predefined chain controlling the hardware operations for a predefined hardware function.

In accordance with features of the invention, the predefined hardware function includes buffer allocation to allocate/deallocate volatile and non-volatile buffers used by the firmware engines, eliminating the need for firmware operations. The predefined hardware function includes automatic Direct Memory Access (DMA) to automatically DMA data from a host system for write operations to the controller.

In accordance with features of the invention, the controller includes a processor complex, and the predefined hardware function is completed without an interaction with or from the processor complex. An automatic DMA completion is placed on a HW event queue when the DMA completes. The HW event queue is coupled to a processor complex notifying the processor complex of DMA completion.

In accordance with features of the invention, the controller automatic hardware structure automatically determines that the host system issued a write request, controller automatic hardware structure allocates either a volatile or non-volatile buffer for write caching, and controller automatic hardware structure DMAs the data into the buffer, and completes the automatic DMA before informing controller firmware of the host Write request.

In accordance with features of the invention, automatic hardware structure performs resource limit checking and queuing. The automatic hardware structure compares a resource handle (RH) with a hardware resource handle information, and checks a global page pool for the automatic DMA. If blocked, automatic hardware structure places the automatic DMA on a RH wait queue before being placed on an allocate hardware engine work queue.

BRIEF DESCRIPTION OF THE DRAWINGS

The present invention together with the above and other objects and advantages may best be understood from the following detailed description of the preferred embodiments of the invention illustrated in the drawings, wherein:

FIG. 3A illustrates an example control store (CS) structure including a plurality of sequential control blocks in accordance with the preferred embodiment;

FIG. 7A is a logic flow illustrating an exemplary implementation of resource limit checking and queuing hardware of FIG. 6A based on Resource Handle information in accordance with the preferred embodiment;

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and a controller implement enhanced storage adapter performance and performance optimization with hardware accelerators for buffer allocation and to automatically DMA data from the host for write operations, and a design structure on which the subject controller circuit resides is provided.

Figure 1:
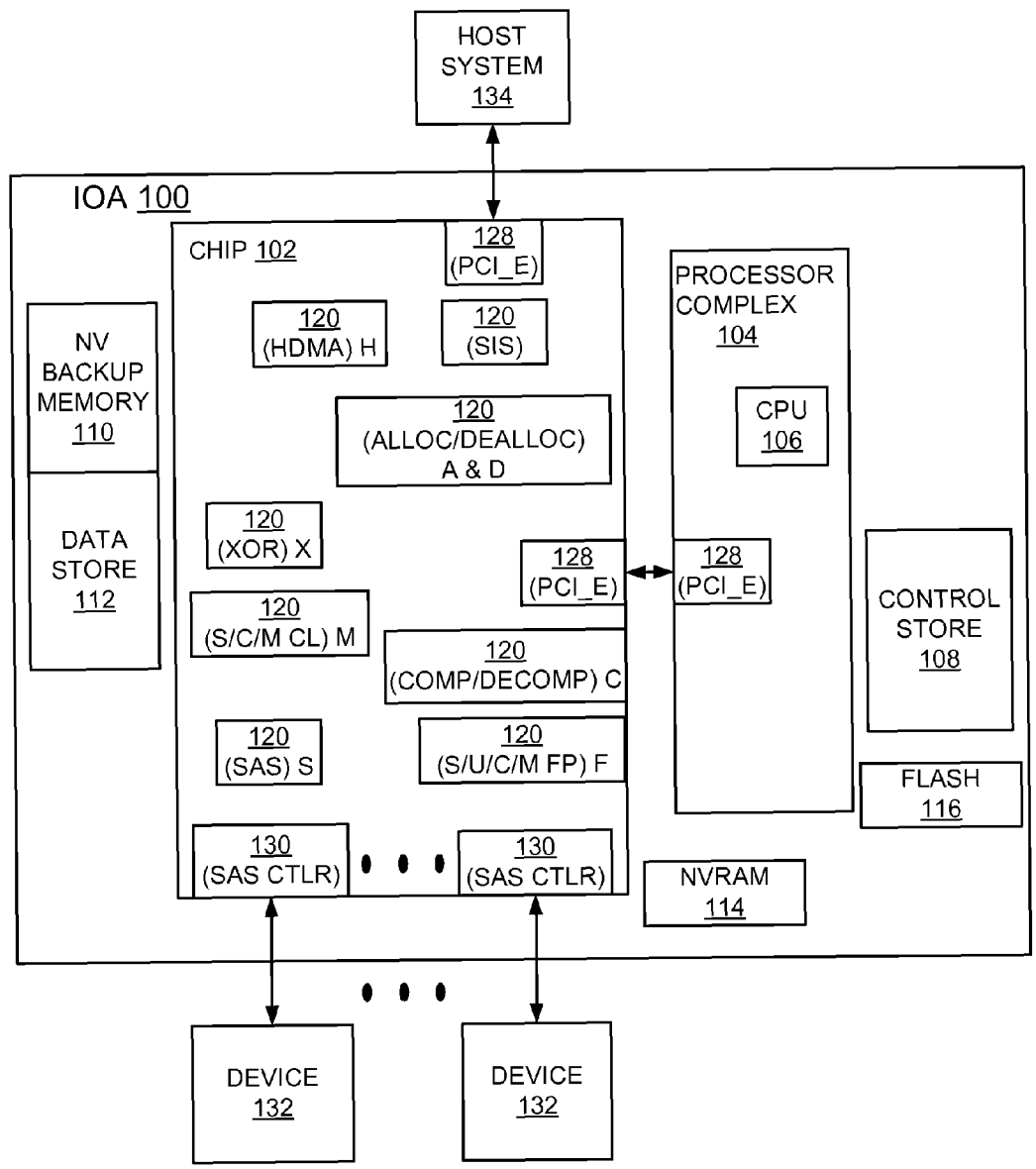
FIG. 1 is a schematic and block diagram illustrating an exemplary system for implementing storage adapter performance optimization with automatic chained hardware operations eliminating firmware operations in accordance with the preferred embodiment.

Having reference now to the drawings, in FIG. 1, there is shown an input/output adapter (IOA) or controller in accordance with the preferred embodiment generally designated by the reference character 100. Controller 100 includes a semiconductor chip 102 coupled to at least one processor complex 104 including one or more processors or central processor units (CPUs) 106. Controller 100 includes a control store (CS) 108, such as a dynamic random access memory (DRAM) proximate to the CPU 106 providing control block, work queue and event queue storage. Controller 100 includes a non-volatile (NV) backup memory 110 and a data store (DS) 112 providing data and scratch buffers for control block set up and processing, for example, performed by hardware. Controller 100 includes a non-volatile random access memory (NVRAM) 114, and a flash memory 116.

In accordance with features of the invention, controller 100 implements methods that uniquely chains together hardware operations with automatic chained hardware operations eliminating firmware operations including buffer allocation and automatically DMA data from a host system for Write operations to the controller.

Controller semiconductor chip 102 includes a plurality of hardware engines 120, such as, a host direct memory access (HDMA) engine 120, a SIS engine 120, an allocate and deallocate engine 120, an XOR or sum of products (SOP) engine 120, a Serial Attach SCSI (SAS) engine 120, a set/update/clear/mirror footprint (S/U/C/M FP) engine 120, and a compression/decompression (COMP/DECOMP) engine 120.

In accordance with features of the invention, substantial conventional firmware function is moved to HW operations performed by the hardware engines 120. The hardware engines 120 are completely heterogeneous, and are fully extensible with chaining any engine to any other engine enabled.

As shown, controller semiconductor chip 102 includes a respective Peripheral Component Interconnect Express (PCIe) interface 128 with a PCIe high speed system interconnect between the controller semiconductor chip 102 and the processor complex 104, and a Serial Attach SCSI (SAS) controller 130 with a SAS high speed system interconnect between the controller semiconductor chip 102 and each of a plurality of storage devices 132, such as hard disk drives (HDDs) or spinning drives 132, and solid state drives (SSDs) 132. A host system 134 is connected to the controller 100 with a PCIe high speed system interconnect.

DS 112, for example, 8 GB of DRAM, stores volatile or non-volatile pages of Data, such as 4 KB page of Data or 8*528-bytes usable data or 64 CAS access (66-bytes), 32-byte cache line (CL) with one CL for each non-volatile page of the write cache in a contiguous area of DS and 32-byte parity update footprint (PUFP) in a contiguous area of DS after the CL area.

Figure 3B:
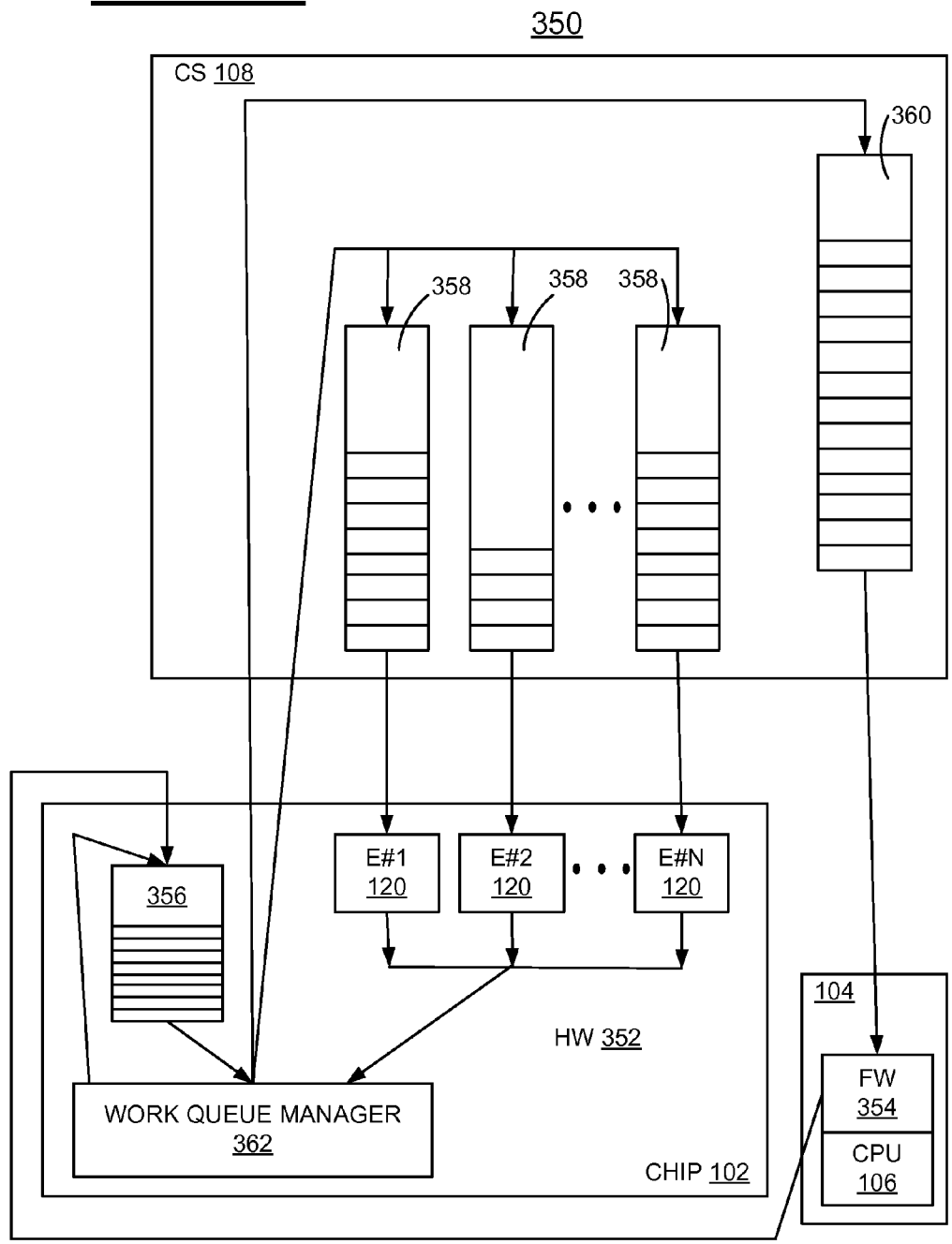
FIG. 3B illustrates an enhanced hardware (HW) and firmware (FW) interface including a plurality of example hardware (HW) Work Queues and a HW Event Queue stored in the control store (CS) in accordance with the preferred embodiment.

The control store (CS) 108 stores other structures and control blocks, such as illustrated and described with respect to FIGS. 3A and 3B, and FIGS. 4A and 4B. The control store (CS) 108 includes a control block (CB) buffer area, such as 8 MB size and 8 MB alignment, a HW Event Queue, such as 4 MB size and 4 MB alignment, providing 1M entries of 4 B each, SIS SEND Queue, such as 64 KB size and 64 KB alignment, providing 4K entries of 16 B each, Index Free List Volatile and Index Free List Non-Volatile, each such as 4 MB size and 4 MB alignment, providing 1M entries of 4 B each, HW Work Queues (WQ), such as 512 KB size and 512 KB alignment, providing 32 WQ of 16 KB each. Other structures in the CS 108 include Page Table Index Lists, such as 4 B, 1-N entries of 4 B each, which can be anywhere in the 256 MB space and are often within the 8 MB CS buffer area, CS target Buffers of 128 B alignment, where each buffer is 1 KB, and can be anywhere in the 256 MB space, and HW CB of 64 B alignment, which are within the 8 MB CS buffer area, such as illustrated in FIG. 3A.

Figure 2A:
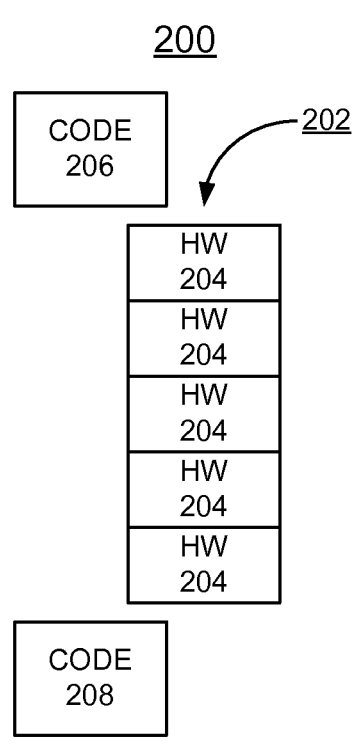
FIG. 2A illustrates example chained hardware operations minimizing hardware and firmware interactions in accordance with the preferred embodiment.

Referring to FIG. 2A, there are shown example chained hardware operations minimizing hardware and firmware interactions in accordance with the preferred embodiment generally designated by the reference character 200. The chained hardware operations 200 include a chain 202 of a plurality of sequential operations by hardware (HW) 204 with an initial interaction with code or firmware (FW) 206 at the initial setup and another interaction with FW 208 at the completion of the series or chain 202 of operations by HW 204.

In accordance with features of the invention, the types of chained operations include Buffer Allocate, Buffer Deallocate, SAS Read-XOR, SAS Write, and Setting Parity Update Footprint (PUFP), Clearing PUFP, Mirrored write of a PUFP to a remote adapter, Mirrored write of cache data to remote adapter, and the like. For example, the following is an example of chained operations for a RAID-5 write: a) Buffer allocate, b) Read-XOR of data, c) Setting of PUFP, d) Write of data, e) Update parity footprint, f) Read-XOR of parity, g) Write of parity, h) Clearing of PUFP, and i) Buffer deallocate. For example, the following is an example of chained operations for automatically DMA of write data: a) Buffer allocate, and b) DMA of host data.

Figure 2B:
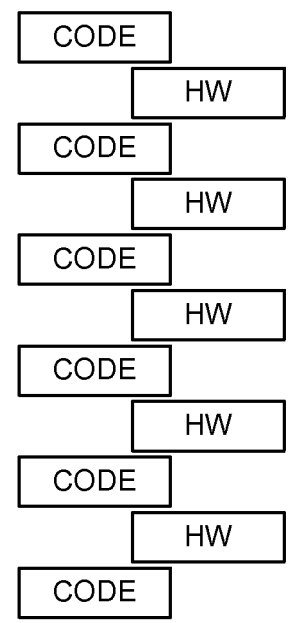
FIG. 2B illustrates conventional prior art storage adapter hardware and firmware interactions.

FIG. 2B illustrates conventional prior art storage adapter hardware and firmware interactions that includes a code or firmware (FW) and hardware interaction with each of multiple IOA operations. As shown in FIG. 2A, the chained hardware operations 200 of the invention, significantly reduces the firmware path length required for an I/O operation. The chained hardware operations 200 of the invention are arranged to minimize hardware/firmware interactions in order to maximize performance.

Referring to FIG. 3A, there is shown an example control store (CS) structure generally designated by the reference character 300 in accordance with the preferred embodiment. CS structure 300 includes predefined fields including an offset 302, size 304, and definition 306. CS structure 300 includes a plurality of sequential control blocks (HW CB) #1-17, 308, for example, which are selectively arranged in a predefined chain to minimize hardware and firmware interaction, such as to minimize the hardware engines 120 writing event queue entries to the processor complex 104.

As illustrated in FIG. 3A, each predefined chain includes sequential control blocks 308 stored within contiguous memory in CS 108. Each predefined chain defines controls applied to respective hardware engines 120. Each control block 308 can be linked to any other control block 308 defining a predefined chain of operations. For example, each buffer in CS structure 300 is 2 KB in size. FW gives these buffers to HW by writing CS Indices to the Global Hardware (HW) Work Queue. HW returns to FW by writing to the HW Event Queue, as illustrated and described with respect to FIG. 3B.

In accordance with features of the invention, the hardware engines 120 are arranged to automatically DMA data from the host system 134 to the controller 100. Hardware (HW) of controller 100 fetches an IOA Request Control Block (IOARCB) from the host, HW builds an allocate CB and HDMA CB, DMAs the data from host to the DS, then notifies FW via the HW Event Queue. The hardware engines 120 are arranged to run some functions in parallel, such as 4 host DMA engines 120, and the like. The hardware engines 120 are arranged to run multiple ops on different steps of the same function, such as an a SIS engine 120 fetches an IOARCB from the host at the same time that the SIS engine 120 is DMAing the previous IOARCB to CS 108 and building the HDMA prefetch command.

Referring to FIG. 3B, there is shown an enhanced hardware (HW) and firmware (FW) interface generally designated by the reference character 350 in accordance with the preferred embodiment. The HW/FW interface 350 includes a HW block 352 including the plurality of HW engines 120 in the controller chip 102 and a firmware block 354 provided with the CPU 106 in the processor complex 104. The HW/FW interface 350 includes a global hardware (HW) Work Queue 356, such as a small embedded array in the controller chip 102. The global HW Work Queue 356 is coupled to each of a plurality of hardware (HW) Work Queues 358.

Each of the plurality of hardware (HW) Work Queues 358 is applied to respective hardware engines 1-N, 120 within the chip 102. A HW Event Queue 360 is coupled to firmware (FW) 354 providing completion results to the processor complex 104. A Work Queue Manager 362 in the controller chip 102 is coupled to each of the plurality of hardware (HW) Work Queues 358 and hardware engines 1-N, 120, and to the HW Event Queue 360. The global HW work queue 356 includes a queue input coupled to FW 354 in the processor complex 104 and a queue input coupled to the Work Queue Manager 362 in the controller chip 102. The Work Queue Manager 362 and the global HW work queue 356 provide an input to the HW Event Queue 360. The HW Work Queues 358, and the HW Event Queue 360 are stored in the control store (CS) 108.

In accordance with features of the invention, the hardware engines 120 are arranged to automatically DMA data from the host system 134 to the controller 100. The HDMA engine 120 DMAs the data from host system 134 to the CS 108 or DS 112, then notifies FW via the HW Event Queue 360. The hardware engines 120 are arranged to run some functions in parallel, such as 8 or 12 SAS engines 120, 4 host DMA engines 120, and the like. The hardware engines 120 are arranged to run multiple operations on different steps of the same function, such as an HDMA engine 120 fetches data from the host system 134 at the same time that another HDMA engine 120 is DMAing other data to the host system 134.

In accordance with features of the invention, each control block 308 includes a common header including a control block ID, a chain position, and a next control block ID. The control block chain position identifies a first in chain, a last in chain, middle in linked chain, or stand alone. The common header includes a predefined hardware event queue entry selectively written when the control block completes. The predefined hardware event queue entry is written when a stand alone control block completes and the last in chain control block completes. The predefined hardware event queue entry is written when control block fails with an error.

Figure 4B:
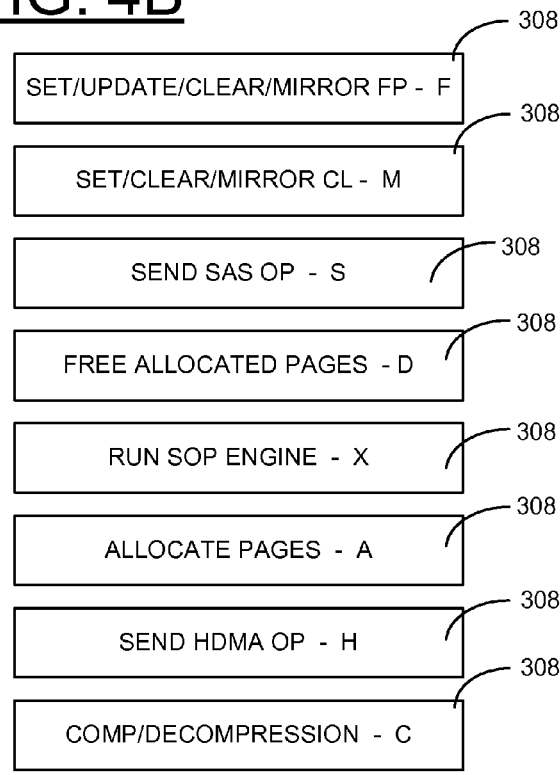
FIG. 4B illustrates a plurality of example control blocks in accordance with the preferred embodiment.
Figure 4A:
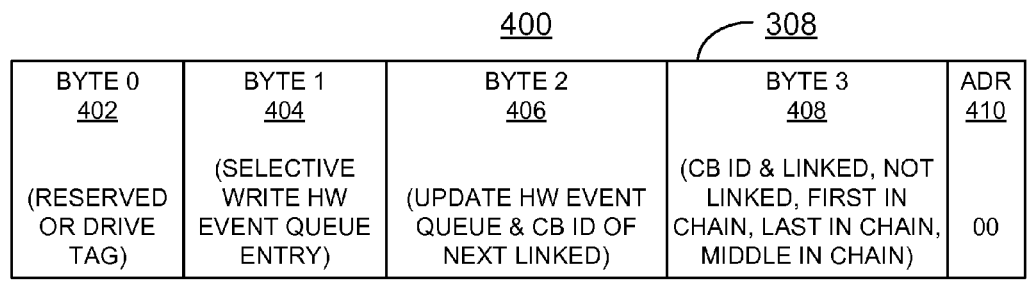
FIG. 4A illustrates an example common header of a control block in accordance with the preferred embodiment.

Referring also to FIG. 4A, there is shown an example common header generally designated by the reference character 400 of the control block 308 in accordance with the preferred embodiment. Each control block header 400 includes a byte 0, 402, for example, reserved or drive tag.

Each control block header 400 includes a byte 1, 404 including for example, a selective write HW Event Queue entry. The predefined hardware event queue entry 404 is selectively written when the control block completes. The predefined hardware event queue entry 404 is written when a stand alone control block completes or a last in chain control block completes. The predefined hardware event queue entry 404 is written when control block fails with an error.

Each control block header 400 includes a byte 2, 406 including an update HW Event Queue entry and a next control block engine identification (ID) 406. The HW Event Queue 360 shown in FIG. 3B is a circular first-in first-out (FIFO) in the CS 108. The HW Event Queue 360 is aligned on a 4M-byte address boundary, and is 4M-bytes in size. This size allows the queue to be a history of the last 1M events. HW writes 4-byte entries 406 to the HW Event Queue for each event. FW periodically reads and removes the entries from the HW Event Queue.

Each control block header 400 includes a byte 3, 408, including a control block engine ID and a chain position 408, and includes a header address (ADR) 410. The control block chain position 408 identifies a first in chain, a last in chain, middle in linked chain, or stand alone control block chain position.

Chained or stand alone CB execution begins when an entry is removed from the Global HW Work Queue 356 and dispatched by the Work Queue Manager 362 to one of the HW Work Queues 358 coupled to one of the Hardware Engines 120. Hardware Engines 120 in FIG. 3B can execute a chain of control blocks, HW CB #1-17, 308, as shown in FIG. 3A and further illustrated in FIGS. 4A, and 4B. The HW CB 308 links to the next operation in the predefined chain when the current engine 120 completes execution of its operation in the predefined chain. The mechanism for the next HW CB 308 in a respective predefined chain to eventually start execution is initiated by the respective hardware engine 120. The hardware engine 120 when completing execution of its HW CB 308 in the chain, adds 64 to its current CB address in CS 108, which then forms a new CB address in CS 108 that maps directly to the next 64 byte Offset 302 in the chain shown in FIG. 3A. This new CB address, together with the CB ID Next Linked field 406, is given to the Work Queue Manager 362 by hardware engine 120. The Work Queue Manager 362 then adds a new entry to Global HW WQ 356. The next CB in the predefined chain will then execute when this entry is removed from the Global HW WQ 356 and dispatched to one of the HW Work Queues 358.

Referring to FIG. 4B, there are shown a plurality of example control blocks in accordance with the preferred embodiment. The control blocks 308 include:

Set/Update/Clear/Mirror FP (Footprint) - F,
Set/Clear/Mirror CL - M,
Send SAS Op - S,
Free Allocated Pages - D,
Run SOP Engine - X,
Allocate Pages - A,
Send HDMA Op - H, and
Comp/Decompression - C.

With the Set/Update/Clear/Mirror FP (Footprint)—F control block 308, CS actions performed by HW or S/U/C/M FP engine 120 include for example, Read 32 Bytes from CS 108, for Set, for each 4K, Read 32 Bytes, Write 32 Bytes to DS 112 and Write 32 Bytes to NVRAM 114, and optionally mirror to remote controller; for Update, Read 32 Bytes from CS 108 or DS 112, Write 32 Bytes to DS 112 and Write 32 Bytes to NVRAM 114, and optionally mirror to remote controller; and for Clear, Write 32 Bytes to DS 112 and Write 32 Bytes to NVRAM 114, and optionally mirror to remote controller.

With the Set/Clear/Mirror CL—M control block 308, CS actions performed by HW or S/C/M CL engine 120 include for example, Read 32 Bytes from CS 108, for Set, for each 4K, Read 32 Bytes, Write 32 Bytes to DS 112 and For each 4K, Read 4 byte index, and may read 4K from DS 112 and optionally mirror to remote controller; and for Clear, For each 4K, Read 4 byte index, and Write 32 Bytes to DS 112 and optionally mirror to remote controller.

With the Send SAS Op—S control block 308 and the Send HDMA Op—H, CS actions performed by HW or the respective SAS engine 120 and the HDMA engine 120 include for example, For each 4K, SAS engine 120 and the HDMA engine 120 Read 4 byte index, and HDMA engine 120 will Read or Write 4K to DS 112, and SAS engine 120 may read and write 4K to DS 112. The HDMA engine 120 moves data between DS 112 and the host system 134, and the SAS engine 120 moves data between DS 112, and the storage devices 132.

With the Free Allocated Pages—D and the Allocate pages—A control blocks 308, CS actions performed by HW or the Alloc/Dealloc engine 120 include for example, for each 4K, Read 4 Bytes, and Write 4 Bytes.

With the Run SOP Engine—X control block 308, CS actions performed by HW or the XOR engine 120 include for example, For each 4K of Source (for each source), Read 4 Bytes, and Read 4K of DS 112; and For each 4K of Destination (for each destination), Read 4 Bytes, and Write 4K of DS 112. The sum-of-products (SOP) engine 120 takes an input of 0-N source page lists and 0-M destination page lists as well as an N×M array of multipliers. For example, N=18 and M=2. For each 4K, the first source page is read from DRAM and the first set of M multipliers are applied to each byte. The resulting data is put into M on chip accumulation buffers. Each subsequent source page is multiplied by its associated M multipliers and the product XORed with the corresponding accumulation buffers. When every source has been processed, the accumulation buffers are written out to the corresponding M destination buffers. Then, the next 4K is started. This allows computing an N input XOR to compute RAID-5 parity or N input multiply XOR of M equations simultaneously for Reed-Solomon based RAID-6 P & Q redundancy data.

With the Comp/Decompression—C control block 308, CS actions performed by HW or the Comp/Decomp engine 120 include for example, For each logical 4K (compressed data may be <4K), Read 4 Bytes, and Read 4K of DS 112 (or less if doing decompression), Read 4 Bytes, and Write 4K of DS 112 (or less if doing compression), and optionally other operations may be performed.

Figure 5A:
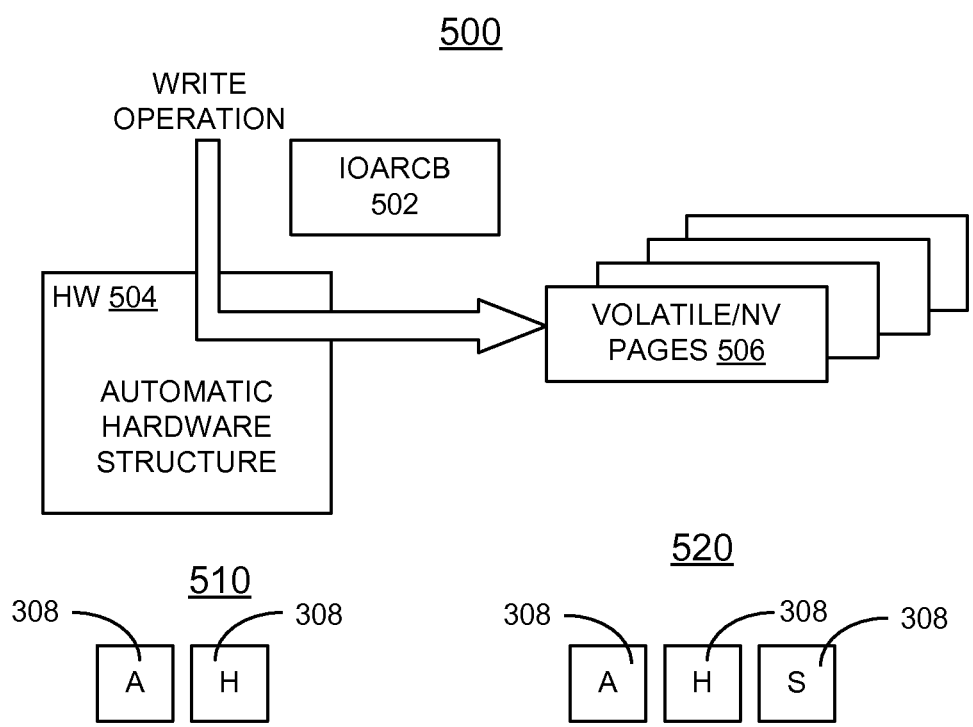
FIGS. 5A and 5B are hardware logic flow and flow chart illustrating exemplary operations performed by a predefined chain of a plurality of the control blocks selectively arranged to implement automatic chained hardware operations eliminating firmware operations in accordance with the preferred embodiment.

A pair of example chains of control blocks 308 built by hardware for a predefined hardware function eliminating firmware operations are illustrated and described with respect to FIG. 5A in accordance with the preferred embodiment. For example, the predefined hardware function includes buffer allocation and automatically DMA data from a host system to the controller for write operations.

In accordance with features of the invention, controller 100 detects when the host requests a write operation to the controller. The controller 100 automatically determines that the host is doing a Write, allocates either a volatile or non-volatile buffer pages, and DMAs the data into the volatile or non-volatile buffer, and completes the automatic DMA data write operation before informing firmware of the host Write request.

Figure 5B:
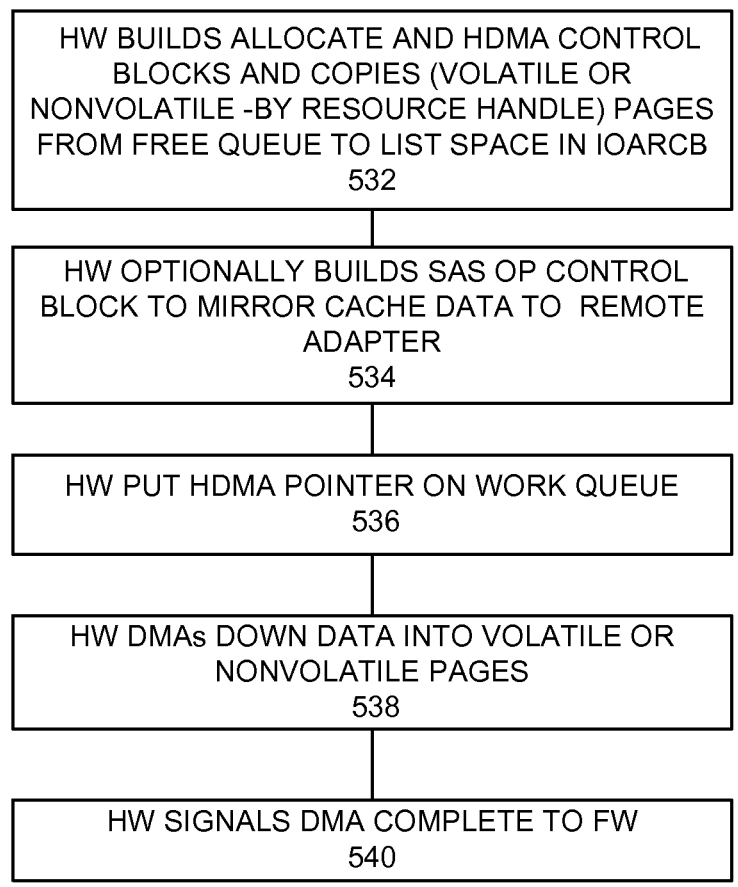

Referring to FIGS. 5A and 5B, there are shown hardware logic operations flow generally designated by the reference character 500 and a flow chart in FIG. 5B illustrating exemplary operations performed by a respective predefined chain generally designated by the reference character 510, and 520 of a plurality of the control blocks 308 arranged to automatically perform buffer allocation, and to DMA data between the host system 134 and CS 108, or DS 112.

FIG. 5A illustrates hardware logic operations 500 for a Write operation from host system 134. A control block IOA Request Control Block (IOARCB) 502 is detected by HW 504. Hardware (HW) 504 includes automatic hardware structure detecting the host write request in the controller 100 and copies the IOARCB 502 to a selected CS buffer.

In FIG. 5A, the chain 510 includes control blocks A, H, and the chain 520 includes control blocks A, H, S as defined in FIG. 4B together with the respective hardware operations shown in FIGS. 5A and 5B. The control block chains 510, 520 are built by HW 504.

For example, the IOA Request Control Block (IOARCB) 502 originates in host storage of host system 134, contains a request for the controller 100, and for many operations IOARCB 502 also contains the full Data Descriptor list. For example, the IOARCB 502 may contain a full Data Descriptor list, a full Data Descriptor list and a full header Data Descriptor, a pointer to Data Descriptor list, or a pointer a Data Descriptor list and a pointer to a header Data Descriptor list. For example, a SIS transport layer is used to send command and response data across the Host PCIe bus between the controller 100 and its host system 134. Automatic hardware structure detection in Hardware (HW) 504 occurs when the host system 134 writes a register, such as an 8-byte register, in controller 100 with the PCI address of the IOARCB 502.

HW 504 automatically processes the IOARCB 502, performing buffer allocation, and automatically DMAs write data. HW 504 DMAs data from the host system 134 to allocated pages 506.

Referring to FIG. 5B, HW builds an allocate and HDMA control blocks 308 as shown in chain 510 and 520 including an allocate control block A and a HDMA control block H, and copies either volatile or nonvolatile (NV) pages from a free queue to list space in the IOARCB 502 as indicated at a block 532. As indicated at a block 534, HW optionally builds SAS Op control block to mirror cache data to a remote or second controller in a dual controller system, as shown in chain 520, control block S. HW puts a HDMA pointer on work queue as indicated at a block 536. HW 504 DMAs down data from the host system 134 into the allocated volatile or nonvolatile (NV) pages 504 as indicated at a block 538. HW signals DMA complete to FW as indicated at a block 540.

Figure 6A:
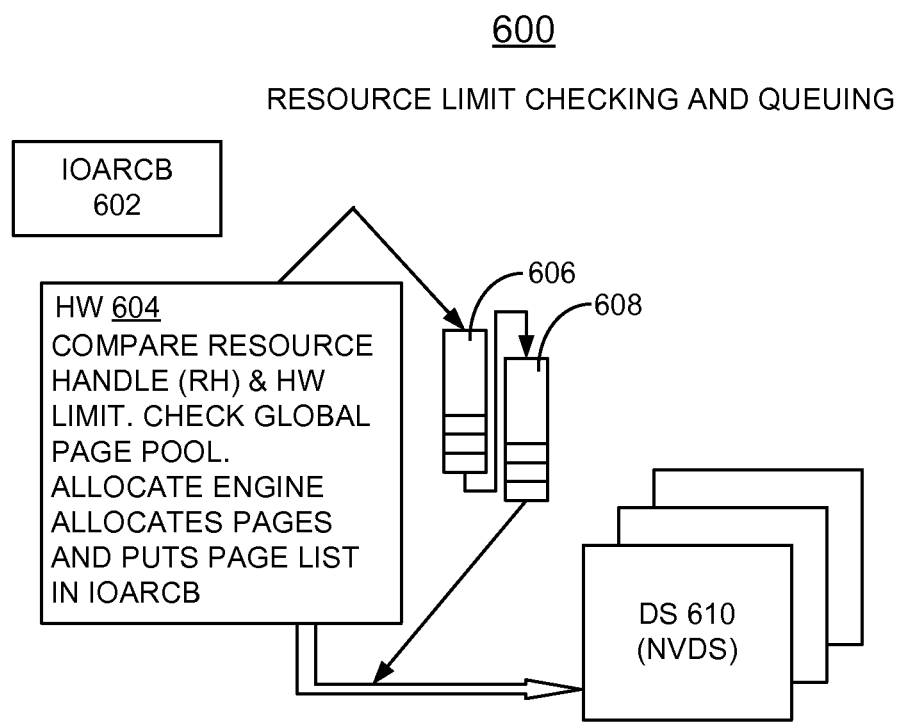
FIGS. 6A and 6B are hardware logic flow and flow chart illustrating exemplary resource limit checking and queuing operations performed by a predefined chain of a plurality of the control blocks selectively arranged to implement automatic chained hardware operations eliminating firmware operation in accordance with the preferred embodiment.
Figure 6B:
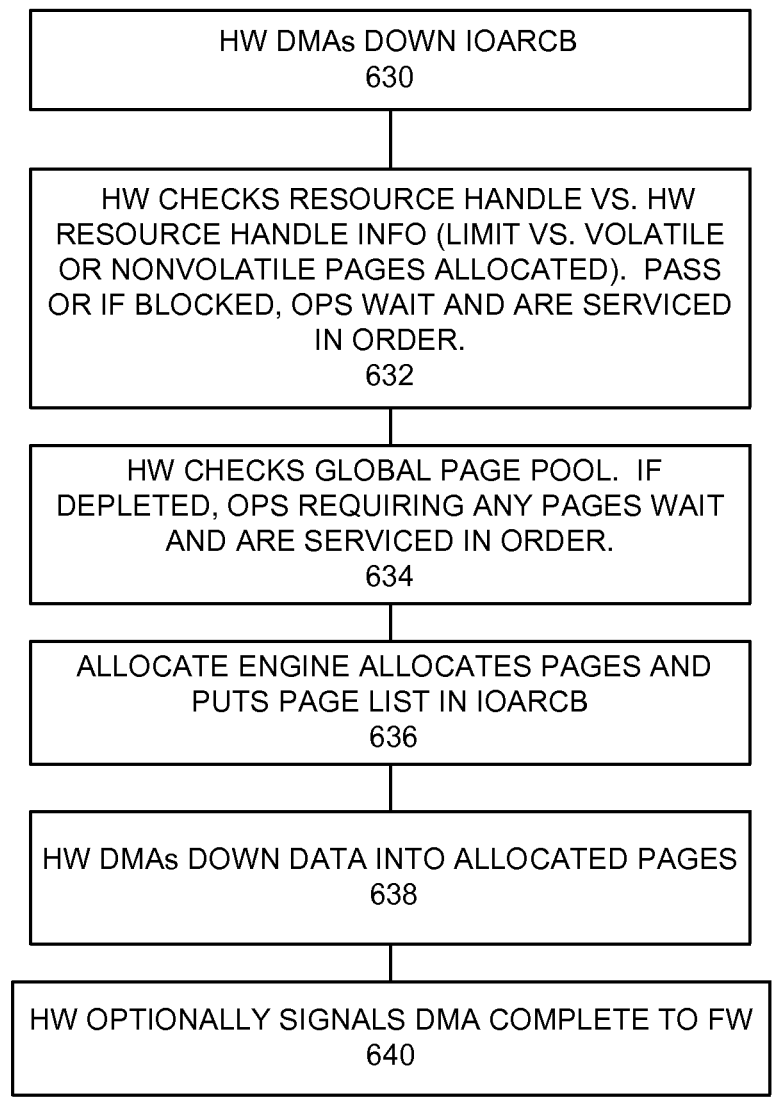

Referring to FIGS. 6A and 6B, there are shown hardware logic operations flow generally designated by the reference character 600 and a flow chart in FIG. 6B illustrating exemplary resource limit checking and queuing operations performed to automatically DMA data between the host system 134, and CS 108 or DS 112.

FIG. 6A illustrates hardware logic operations 600 to perform resource limit checking and queuing operations with a Write operation from host system 134 to the controller 100. An IOARCB 602 for a write Op, either a cached write op or a non-cached write op, is DMAs down by HW 604 in controller 100 from host system 134. The HW 604 is coupled to a plurality of hardware (HW) Work Queues 606 and 608. HW 604, and HW Work Queues 606 and 608 is further illustrated and described with respect to FIGS. 7A and 7B.

HW 604 performs resource limit checking and queuing operations. HW 604 checks a resource handle (RH) with HW resource handle information for the automatic function, such as auto DMA, and passes or blocks the automatic function. For example, if the available number of indices is less than or equal to this op and there are no queued ops for this RH then HW puts this op on the Allocate engine WQ. If the automatic function is blocked and is put at the end of on a RH queue, ops to this resource that require any pages wait and are serviced in order. The Page Limit Counter is used to provide fairness between ops to different Resource Handles by preventing ops set to one Resource Handle from using up all of the Free Pool entries. The Page Limit Counter is used to safeguard against over-committing a cache time limit, limiting the time required to destage the write cached data to devices 134, to enforce time commitments in terms of a required time interval that write caches need to be flushed.

Hardware maintains a single signed counter for the Page Limit Counter. As hardware allocates pages for one Resource Handle, the counter is decremented. If the counter is 0 or less than 0, requests for pages for that resource will be held off. When page space for that resource is freed up, firmware can instruct HW to increment the count. Also, if firmware determines the limit should be changed, firmware can instruct hardware to increment or decrement the counter. Thus the Page Limit Counter keeps both a limit and a current count in one counter.

Once an automatic function has been placed on the Allocate engine WQ, that chain executes normally, and data is automatically DMAed to DS 610. When done, an HDMA completion entry optionally is placed on the HW Event Queue 360 shown in FIG. 3B, which provides completion results to the processor complex 104.

Figure 7B:
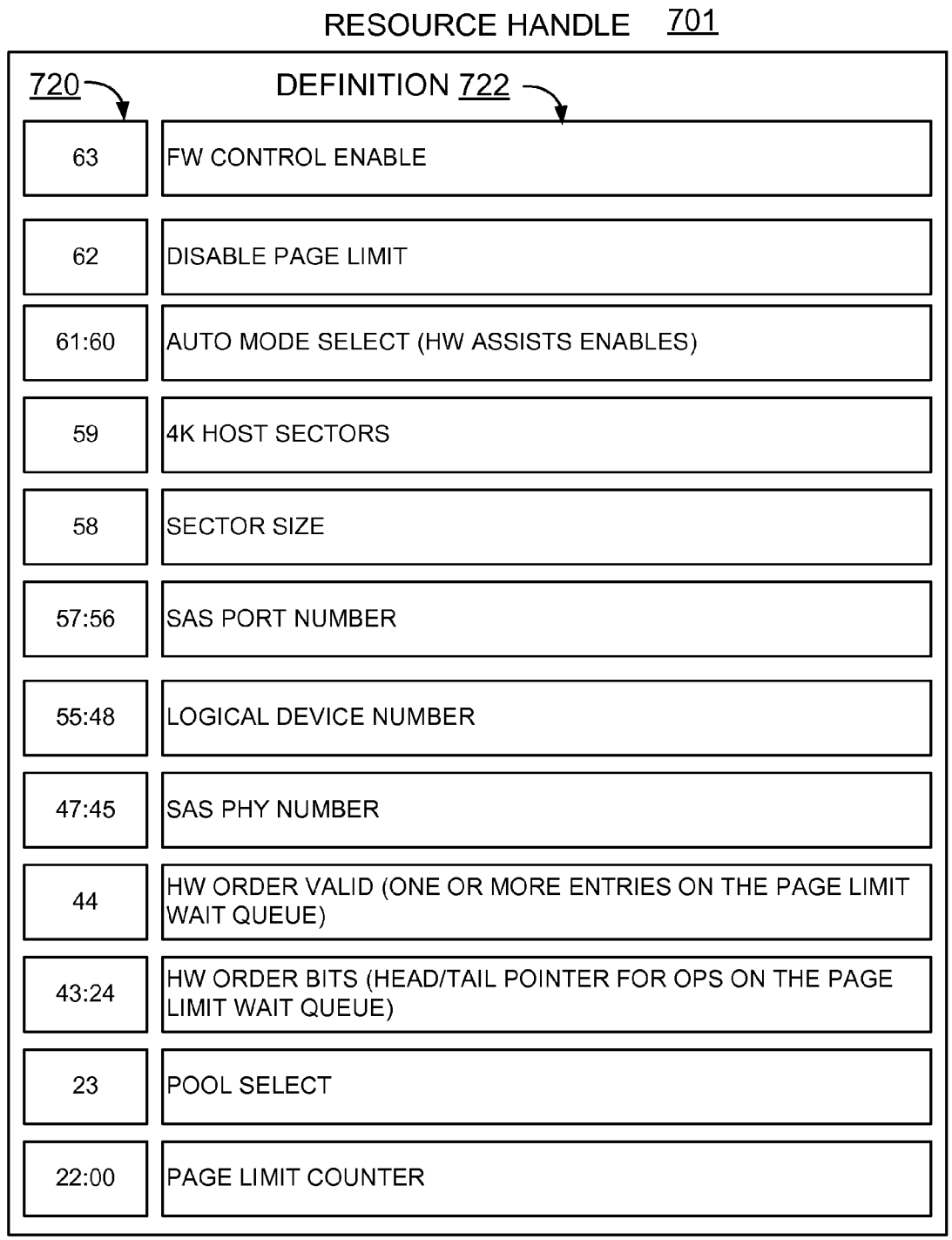
FIG. 7B illustrates an example Resource Handle (RH) in accordance with the preferred embodiment.

Referring also to FIGS. 7A and 7B, in FIG. 7A, there is shown a logic flow illustrating an exemplary implementation of resource limit checking and queuing hardware of FIG. 6A generally designated by reference character 700 based upon Resource Handle information in accordance with the preferred embodiment. Resource limit checking and queuing hardware implementation logic 700 is a more detailed view further illustrating HW 604, and HW Work Queues 606 and 608 of FIG. 6A performing resource limit checking and queuing operations, and FIG. 7B illustrates an example Resource Handle (RH) generally designated by the reference character 701 in accordance with the preferred embodiment.

Referring to FIG. 6B, as indicated at a block 630, DMAs down the IOARCB 602. HW 604 uses information in the IOARCB 602, and information in the Resource Handle 701 to determine which page list to use and how many entries it needs.

As indicated at a block 632 in FIG. 6B, as indicated at a decision block 702 in FIG. 7A, HW checks the resource handle (RH) 701 compared at 704 with HW resource handle information 706 for the automatic function, and passes the automatic function or blocks the automatic function. If blocked, ops to this resource requiring any pages are put at the end of on a RH queue 708. The blocked ops wait and are serviced in order.

As indicated at a block 634 in FIG. 6B, as indicated at a decision block 710 in FIG. 7A, HW 604 checks a global page pool 712 for the ops compared 714 and if depleted, ops requiring any pages are put on global queue 716. The blocked ops wait and are serviced in order. As indicated at a block 636 in FIG. 6B, an allocate engine 716 in FIG. 7A allocates pages and puts a page list in the IOARCB 602. HW 604 DMAs down data into the allocated pages in DS 610, as indicated at a block 638 in FIG. 6B. As indicated at a block 640 in FIG. 6B, HW 604 optionally signals DMA completion to firmware.

Resource Handle 701 includes predefined bits generally designated by the reference character 720 together with a definition generally designated by the reference character 722 as listed in the following Resource Handle Definition Table:

| Resource Handle Definition Table | |
|---|---|
| 63 | FW Control Enable |
| 62 | Disable Page Limit |
| 61:60 | Auto Mode Select (HW assist enables) |
| 59 | 4K host sectors |
| 58 | Sector size |
| 57:56 | SAS Port Number |
| 55:48 | Logical Device Number |
| 47:45 | SAS Phy Number |

-continued

| Resource Handle Definition Table | |
|---|---|
| 44 | HW Order Valid (one or more entries on the Page Limit Wait Queue) |
| 43:24 | HW Order Bits (Head/Tail pointer for ops on the Page Limit Wait Queue) |
| 23 | Pool Select |
| 22:00 | Page Limit Counter |

HW tests and decrements the page limit count when an auto allocate is performed. Firmware writes a HW register to add or subtract a number from a Resource Handle's Page Limit Count. FW adds to this count after it has drained the write cache of a previous op.

Figure 8:
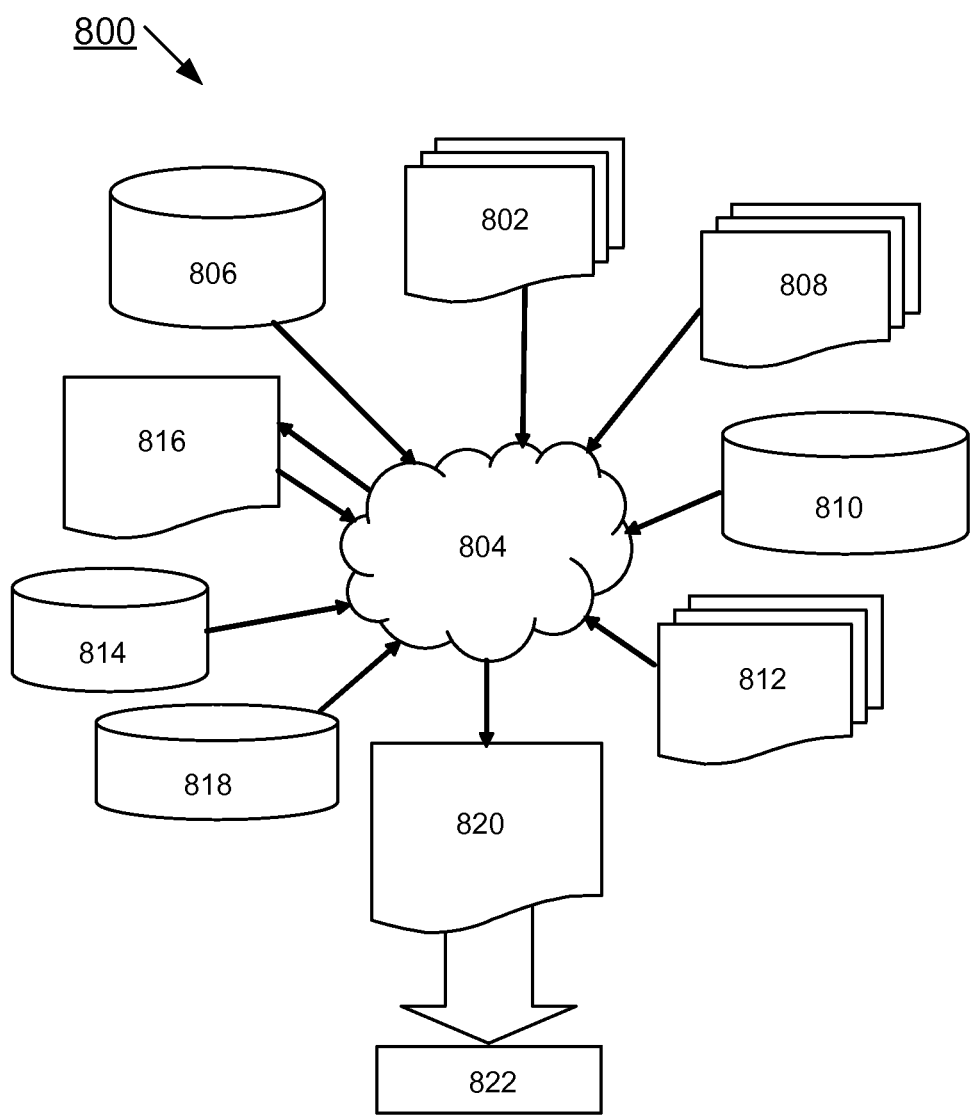
FIG. 8 is a flow diagram of a design process used in semiconductor design, manufacturing, and/or test.

FIG. 8 shows a block diagram of an example design flow 800. Design flow 800 may vary depending on the type of IC being designed. For example, a design flow 800 for building an application specific IC (ASIC) may differ from a design flow 800 for designing a standard component. Design structure 802 is preferably an input to a design process 804 and may come from an IP provider, a core developer, or other design company or may be generated by the operator of the design flow, or from other sources. Design structure 802 comprises circuits 100, 200, 300, 308, 350, 400, 500, 600, 700 in the form of schematics or HDL, a hardware-description language, for example, Verilog, VHDL, C, and the like. Design structure 802 may be contained on one or more machine readable medium. For example, design structure 802 may be a text file or a graphical representation of circuits 100, 200, 300, 308, 350, 400, 500, 600, 700. Design process 804 preferably synthesizes, or translates, circuit 100 into a netlist 806, where netlist 806 is, for example, a list of wires, transistors, logic gates, control circuits, I/O, models, etc. that describes the connections to other elements and circuits in an integrated circuit design and recorded on at least one of machine readable medium. This may be an iterative process in which netlist 806 is resynthesized one or more times depending on design specifications and parameters for the circuit.

Design process 804 may include using a variety of inputs; for example, inputs from library elements 808 which may house a set of commonly used elements, circuits, and devices, including models, layouts, and symbolic representations, for a given manufacturing technology, such as different technology nodes, 32 nm, 45 nm, 90 nm, and the like, design specifications 810, characterization data 812, verification data 814, design rules 816, and test data files 818, which may include test patterns and other testing information. Design process 804 may further include, for example, standard circuit design processes such as timing analysis, verification, design rule checking, place and route operations, and the like. One of ordinary skill in the art of integrated circuit design can appreciate the extent of possible electronic design automation tools and applications used in design process 804 without deviating from the scope and spirit of the invention. The design structure of the invention is not limited to any specific design flow.

Design process 804 preferably translates an embodiment of the invention as shown in FIGS. 1, 2A, 3A, 3B, 4A, 4B, 5A, 5B, 6A, 6B, 7A and 7B along with any additional integrated circuit design or data (if applicable), into a second design structure 820. Design structure 820 resides on a storage medium in a data format used for the exchange of layout data of integrated circuits, for example, information stored in a GDSII (GDS2), GL1, OASIS, or any other suitable format for storing such design structures. Design structure 820 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1, 2A, 3A, 3B, 4A, 4B, 5A, 5B, 6A, 6B, 7A and 7B. Design structure 820 may then proceed to a stage 822 where, for example, design structure 820 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A data storage system comprising:
a controller comprising
a plurality of hardware engines;
a control store configured to store a plurality of control blocks;
each control block designed to control a hardware operation in one of the plurality of hardware engines;
a plurality of the control blocks selectively arranged in a predefined chain to minimize hardware and firmware interaction and to define sequences of hardware operations; each control block being selectively linked to any other control block defining said predefined chain;
each said predefined chain including sequential control blocks stored within contiguous memory in said control store;
an automatic hardware structure configured to build the respective predefined chain defining controls applied to respective hardware engines controlling the hardware operations for a predefined hardware function; and said control blocks being selectively linked to a plurality of other control blocks, providing parallel dispatch of controls applied to respective hardware engines running on different steps for the same function.

2. The data storage system as recited in claim 1, wherein said predefined hardware function includes buffer allocation to selectively allocate volatile or non-volatile pages used by a plurality of firmware engines.

3. The data storage system as recited in claim 1, wherein said predefined hardware function includes an automatic Direct Memory Access (DMA) function to automatically DMA data from a host system to the controller for write operation, eliminating firmware operations.

4. The data storage system as recited in claim 1, wherein said automatic hardware structure automatically detects a write request issued by a host system and copies an input/output (IO) adapter (IOA) Request Control Block (IOARCB) for the write request issued by the host system.

5. The data storage system as recited in claim 4, wherein said automatic hardware structure builds said respective predefined chain controlling the hardware operations to allocate pages in a buffer for data for write operations.

6. The data storage system as recited in claim 1, wherein said automatic hardware structure builds said respective predefined chain controlling the hardware operations to Direct Memory Access (DMA) data into allocated pages in a buffer for data for write operations before informing adapter firmware of the host write request.

7. The data storage system as recited in claim 1, wherein said automatic hardware structure performs resource limit checking and queuing.

8. The data storage system as recited in claim 1, wherein said automatic hardware structure places an automatic Direct Memory Access (DMA) completion entry on a Hardware (HW) event queue when the automatic DMA completes.

9. The data storage system as recited in claim 8, wherein said HW event queue is coupled to a processor complex, said automatic DMA completion entry notifying the processor complex of the automatic DMA completion.

10. A method for implementing storage adapter performance optimization in a data storage system comprising:
providing a controller comprising a plurality of hardware engines and a processor;
using said processor, providing a control store configured to store a plurality of control blocks;
providing each control block designed to control a hardware operation in one of the plurality of hardware engines;
providing a plurality of the control blocks selectively arranged in a predefined chain to minimize hardware and firmware interaction and to define sequences of hardware operations; each control block being selectively linked to any other control block defining said predefined chain;
providing each said predefined chain including sequential control blocks stored within contiguous memory in said control store;
providing an automatic hardware structure configured to build the respective predefined chain defining controls applied to respective hardware engines controlling the hardware operations for a predefined hardware function; and
selectively linking said control blocks to a plurality of other control blocks, providing parallel dispatch of controls applied to respective hardware engines running on different steps for the same function.

11. The method as recited in claim 10, wherein providing an automatic hardware structure configured to build the respective predefined chain controlling the hardware operations for a predefined hardware function includes said automatic hardware structure building the respective predefined chain controlling the hardware operations for buffer allocation to selectively allocate volatile or non-volatile pages used by a plurality of firmware engines.

12. The method as recited in claim 10, wherein providing an automatic hardware structure configured to build the respective predefined chain controlling the hardware operations for a predefined hardware function includes said automatic hardware structure building the respective predefined chain controlling the hardware operations for automatic DMA to automatically DMA data from a host system to the controller for write operation, eliminating firmware operations.

13. The method as recited in claim 10, wherein said automatic hardware structure automatically detects a write request issued by a host system and copies an input/output (IO) adapter (IOA) Request Control Block (IOARCB) for the write request issued by the host system.

14. The method as recited in claim 10, wherein said automatic hardware structure builds said respective predefined chain controlling the hardware operations to allocate pages in a buffer for data for write operations.

15. The method as recited in claim 10, wherein said automatic hardware structure builds said respective predefined chain controlling the hardware operations to Direct Memory Access (DMA) data into allocated pages in a buffer for data for write operations before informing adapter firmware of the host write request.

16. The method as recited in claim 10, wherein said automatic hardware structure places an automatic Direct Memory Access (DMA) completion entry on a Hardware (HW) event queue when an automatic DMA completes, said HW event queue is coupled to a processor complex, said automatic DMA completion entry notifying the processor complex of the automatic DMA completion.

17. A design structure embodied in a non-transitory machine readable medium used in a design process, the design structure comprising:
a controller circuit tangibly embodied in the non-transitory machine readable medium used in the design process, said controller circuit for implementing storage adapter performance optimization in a data storage system, said controller circuit comprising:
a plurality of hardware engines;
a control store configured to store a plurality of control blocks;
each control block designed to control a hardware operation in one of the plurality of hardware engines;
a plurality of the control blocks selectively arranged in a predefined chain to minimize hardware and firmware interaction and to define sequences of hardware operations; each control block being selectively linked to any other control block defining said predefined chain;
each said predefined chain including sequential control blocks stored within contiguous memory in said control store; and
an automatic hardware structure configured to build the respective predefined chain defining controls applied to respective hardware engines controlling the hardware operations for a predefined hardware function; and said control blocks being selectively linked to a plurality of other control blocks, providing parallel dispatch of controls applied to respective hardware engines running on different steps for the same function, wherein the design structure, when read and used in the manufacture of a semiconductor chip produces a chip comprising said controller circuit.

18. The design structure of claim 17, wherein the design structure comprises a non-transitory netlist, which describes said controller circuit.

19. The design structure of claim 17, wherein the design structure resides on the non-transitory machine readable medium as a data format used for the exchange of layout data of integrated circuits.

20. The design structure of claim 17, wherein the design structure resides on the non-transitory machine readable medium and includes at least one of test data files, characterization data, verification data, or design specifications.

21. The design structure of claim 17, wherein said predefined hardware function includes buffer allocation to selectively allocate volatile or non-volatile pages used by a plurality of firmware engines.

22. The design structure of claim 17, wherein said predefined hardware function includes an automatic Direct Memory Access (DMA) function to automatically DMA data from a host system to the controller for write operation, eliminating firmware operations.

* * * * *